United States Patent
Mattsson et al.

(10) Patent No.: US 7,325,129 B1
(45) Date of Patent: Jan. 29, 2008

(54) METHOD FOR ALTERING ENCRYPTION STATUS IN A RELATIONAL DATABASE IN A CONTINUOUS PROCESS

(75) Inventors: Ulf Mattsson, Stamford, CT (US); Tamojit Das, Stamford, CT (US)

(73) Assignee: Protegrity Corporation, Grand Cayman (KY)

(*) Notice: Subject to any disclaimer, the term of this patent is extended or adjusted under 35 U.S.C. 154(b) by 597 days.

(21) Appl. No.: 09/712,926

(22) Filed: Nov. 16, 2000

(51) Int. Cl.
*H04L 9/00* (2006.01)
*H04L 9/32* (2006.01)
*H04L 9/28* (2006.01)
*G06F 11/30* (2006.01)
*G06F 12/14* (2006.01)
*H04K 1/00* (2006.01)
*G06F 15/16* (2006.01)
*G06F 7/04* (2006.01)
*G06F 7/58* (2006.01)
*G06F 12/00* (2006.01)
*G06F 17/30* (2006.01)
*G06K 9/00* (2006.01)
*G06K 19/00* (2006.01)

(52) U.S. Cl. ........... 713/164; 713/193; 713/165; 380/28; 707/200; 707/201; 707/203; 707/204; 726/6

(58) Field of Classification Search ........ 713/164–165, 713/200–201, 193; 709/223–229; 707/1, 707/9, 100, 200, 204, 201, 203; 726/6; 380/28
See application file for complete search history.

(56) References Cited

U.S. PATENT DOCUMENTS

| | | | |
|---|---|---|---|
| 5,043,871 A * | 8/1991 | Nishigaki et al. ........... 707/202 |
| 5,537,533 A * | 7/1996 | Staheli et al. ................. 714/5 |
| 5,574,898 A * | 11/1996 | Leblang et al. ............... 707/1 |
| 5,659,614 A * | 8/1997 | Bailey, III .................. 713/165 |
| 5,850,443 A * | 12/1998 | Van Oorschot et al. ..... 380/285 |
| 5,924,094 A * | 7/1999 | Sutter ......................... 707/10 |
| 6,003,026 A * | 12/1999 | Bonzi ............................ 707/4 |
| 6,321,201 B1 * | 11/2001 | Dahl ............................. 705/1 |
| 6,377,959 B1 * | 4/2002 | Carlson ...................... 707/202 |
| 6,453,325 B1 * | 9/2002 | Cabrera et al. ............. 707/204 |
| 6,564,215 B1 * | 5/2003 | Hsiao et al. ................... 707/8 |
| 6,978,367 B1 * | 12/2005 | Hind et al. ................. 713/167 |
| 7,093,137 B1 * | 8/2006 | Sato et al. .................. 713/193 |
| 7,096,370 B1 * | 8/2006 | Klein ......................... 713/193 |
| 2002/0107877 A1 * | 8/2002 | Whiting et al. ............. 707/204 |
| 2006/0248125 A1 * | 11/2006 | Kawamura .................. 707/201 |

FOREIGN PATENT DOCUMENTS

WO    WO97 49211    12/1997

* cited by examiner

Primary Examiner—Christopher Revak
Assistant Examiner—Shin-Hon Chen
(74) Attorney, Agent, or Firm—George W. Neuner; Steven M. Cohen; Edwards Angell Palmer & Dodge LLP

(57) ABSTRACT

A method for altering encryption status in a relational database in a continuous process, wherein at least one table of said database comprises at least one base area and at least one maintenance area, comprising the steps of: copying all records from said base area to said maintenance area; directing action of commands intended for said base area to said maintenance area; altering encryption status of said base area; copying all data records from said maintenance area to said base area; and redirecting action of commands to said base area.

18 Claims, 1 Drawing Sheet

METHOD FOR ALTERING ENCRYPTION STATUS IN A RELATIONAL DATABASE IN A CONTINUOUS PROCESS

FIELD OF INVENTION

The present invention relates to a method for altering encryption status in a relational database in a continuous process reducing the need for taking the database offline.

BACKGROUND OF THE INVENTION

In order to protect information stored in a database, it is known to store sensitive data encrypted in the database. To access such encrypted data you have to decrypt it, which could only be done by knowing the encryption algorithm and the specific decryption key being used. The access to the decryption keys could be limited to certain users of the database system, and further, different users could be given different access rights.

Specifically, it is preferred to use a so-called granular security solution for the encryption of databases, instead of building walls around servers or hard drives. In such a solution, which is described in the document WO 97/49211 by the same applicant, a protective layer of encryption is provided around specific sensitive data-items or objects. This prevents outside attacks as well as infiltration from within the server itself. This also allows the system manager to define which data stored in databases are sensitive and thereby focusing the protection only on the sensitive data, which in turn minimizes the delays or burdens on the system that may occur from other bulk encryption methods.

Most preferably the encryption is made on such a basic level as in the column level of the databases. Encryption of whole files, tables or databases is not so granular, and does thus encrypt even non-sensitive data. It is further possible to assign different encryption keys of the same algorithm to different data columns. With multiple keys in place, intruders are prevented from gaining full access to any database since a different key could protect each column of encrypted data.

However, there are problems with the previously known database encryption methods. Especially there is a problem when the system manager wants to change which columns that are to be encrypted and which are not to be encrypted, in a 7 days by 24 hours operational database, since the database has to be taken out of operation when encryption is to be added or removed, or changed, to a column.

In most commercial applications accessibility is a critical issue. On the Internet, especially in web-based applications, customers expect a service to be accessible when they want to use it.

Current encryption systems which encrypts data in databases, especially commercial relational databases, has to be taken offline or be only partly available when adding or removing encryption on data.

OBJECT OF THE INVENTION

It is therefore an object of the present invention to provide a method which allows altering of encryption status in a relational database in a continuous process, which significantly reduces or eliminates the need for making the database unavailable or only partly available, overcoming the above mentioned problems.

This object is achieved by means of a method according to the appended claims.

SUMMARY OF THE INVENTION

According to the invention, a method for altering encryption status in a relational database in a continuous process, wherein at least one table of said database comprises at least one base area and at least one maintenance area, comprising the steps of: copying all records from said base area to said maintenance area; directing action of commands intended for said base area to said maintenance area; altering encryption status of said base area; copying all data records from said maintenance area to said base area; and redirecting action of commands to said base area.

Hereby a method is provided which significantly improves the uptime of a database system. With this method the database owner easily can alter encryption settings in the database while it is up and running. Since a rerouting of the access is provided, data will always be accessible. Thus, the security administrator (SA) can independently of any constraints regarding when the database has to be up add or remove encryption when it is needed. For example, if a security leak is found in a web-application such as an Internet store during rush hours, the management of that company would with previous solutions have had to decide whether to risk sales or risk that someone would intrude in their system gaining access to unencrypted data in the database. This is eliminated with the method according to the invention. Another advantage is that regular maintenance work can be performed during daytime, reducing the need for costly overtime since the maintenance personnel don't have to work when the database can be taken offline, which mostly is during night hours.

The term encryption status is to be understood as how to protect data elements in the base area, for instance whether or not the data elements are subject for encryption. In another embodiment it could also be understood as changing the encryption level, from strong to weak. If the purpose is to remove encryption for data elements in the base area, the data elements are decrypted while they are copied to the maintenance area. Then, if the purpose if to add encryption to data elements, they are encrypted as they are copied to, or from, the maintenance area. Then, when the data elements are temporarily stored in the maintenance area, the settings could be changed for the base area.

The database which is described comprises one or more tables. Action of commands could for example be reading commands resulting in a read operation, or a write command resulting in a write operation.

Preferably, said step of directing is implemented in a trigger which is added to said table.

In an embodiment of the present invention said commands are data manipulation language (DML) statements.

In an embodiment of the present invention each base area in said database table have a corresponding maintenance area.

In an embodiment of the present invention the method comprises the further step of emptying said base area before said step of altering. Preferably this done by updating all the records of the column with NULL.

In an embodiment of the present invention the method comprises the further step of changing the data type of said base area. Preferably, this is changed to RAW.

In an embodiment of the present invention said base area is a first column of said table and said maintenance area is a second column of said table. However, the invention is not limited to this interpretation of an area, for example an area could comprise a set of columns.

According to another embodiment of the invention a method for altering encryption status in a relational database in a continuous process, wherein at least one table of said database comprises at least one base area, and for each base area a corresponding area, comprising the steps of: activating encryption means for said corresponding column; directing action of commands intended for said base area to said maintenance area; copying all records from said base area to said corresponding area; and emptying said base area.

Hereby a method is provided which, in addition to the above mentioned advantages, allows continuous encryption on tables that have explicit locks i.e. row exclusive (RX) or share row exclusive (SRX) locks.

BRIEF DESCRIPTION OF THE DRAWING

For exemplifying purposes, the invention will be described to embodiments thereof illustrated in the attached drawing, wherein.

DESCRIPTION OF A PREFERRED EMBODIMENT

Figure 1:
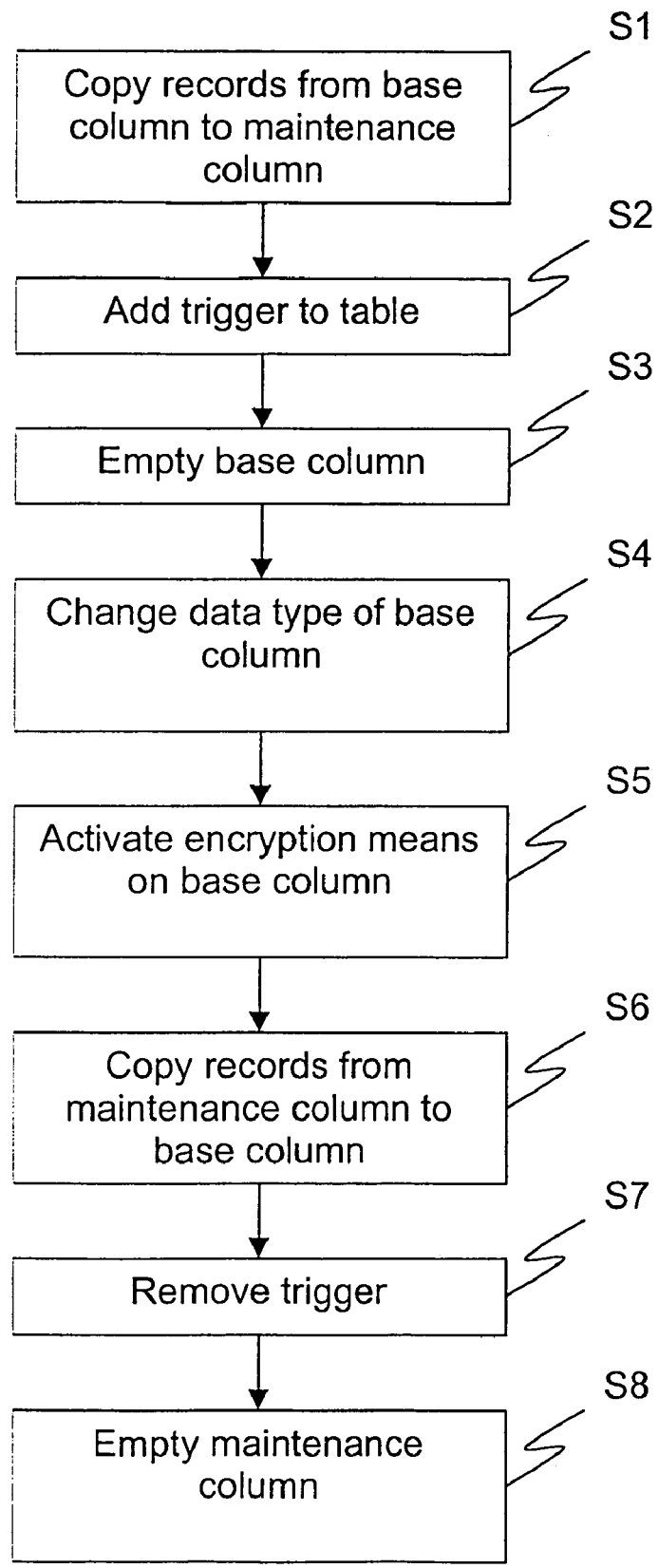
FIG. 1 is a flow-chart illustrating an embodiment of a method according to the invention.

Referring to FIG. 1, a method for altering encryption on column level in a relational database in a continuous process, without the need for taking the database offline according to a preferred embodiment of the invention is now to be described. In this embodiment the altering is performed on column level.

The tables I and II below illustrates an example of a database table, "tab", for which encryption is to be added to a column. Table I describes the structure of the database table "tab" and Table II is an example of the contents in such a table.

TABLE I

| Data element | Data type | Value | Comment |
|---|---|---|---|
| cust_id | NUMBER | NOT NULL | Primary key |
| name | VARCHAR2 (64) | NOT NULL | |
| date_of_birth | DATE | NOT NULL | |
| user_name | VARCHAR2 (32) | NOT NULL | |
| password | VARCHAR2 (32) | NOT NULL | To be encrypted |
| maint | VARCHAR2 (32) | NULL | |

TABLE II

| cust_id | name | date_of_birth | user_name | password | maint |
|---|---|---|---|---|---|
| 1001 | MAX | 19910101 | MNN | abc | NULL |
| 1002 | MARTIN | 19920202 | MKR | cdf | NULL |
| 1003 | JOHAN | 19930303 | JON | ghi | NULL |
| 1004 | MARIE-LOUISE | 19940404 | MLA | jkl | NULL |

The method comprises a first step S1, wherein data is copied from the base column "password" to the maintenance column "maint". The contents of "tab" after the step S1 are shown in Table III.

TABLE III

| cust_id | name | date_of_birth | user_name | password | maint |
|---|---|---|---|---|---|
| 1001 | MAX | 19910101 | MNN | abc | abc |
| 1002 | MARTIN | 19920202 | MKR | cdf | cdf |
| 1003 | JOHAN | 19930303 | JON | ghi | ghi |
| 1004 | MARIE-LOUISE | 19940404 | MLA | jkl | jkl |

Preferably, if needed, the method contains a step, which checks whether the column "password" is nullable, the column does not have a NOT NULL constraint. Then the column is altered to be nullable.

In another step S2 a trigger is added. The object of the trigger is to direct all commands aimed at the base column to the maintenance column, i.e. a synchronization function. Thus, when a user for example sends a update command for the base column, this command is directed to the maintenance column. In order to overcome problems during copying and activation of the trigger, the trigger could be built up from several steps. For instance, it could first synchronize the base and the maintenance column, then when the contents are identical, stop updating the base column at the same time let the maintenance column take over the actions taken on the base column. Preferably the copying of the records from the base column is performed simultaneously with the addition of the trigger.

In another step S3, the base column "password" is emptied. For instance, this could be performed by updating the base column with NULL. Preferably, if it is required by the later applied encryption, the method comprises the further step S4, wherein the table is altered in order to change the base column data type to the data type RAW. The present structure and contents of "tab" is described in tables IV and V, respectively.

TABLE IV

| Data element | Data type | Value | Comment |
|---|---|---|---|
| cust_id | NUMBER | NOT NULL | Primary key |
| name | VARCHAR2 (64) | NOT NULL | |
| date_of_birth | DATE | NOT NULL | |
| user_name | VARCHAR2 (32) | NOT NULL | |
| password | RAW | NULL | To be encrypted |
| maintenance | VARCHAR2 (32) | NOT NULL | |

TABLE V

| cust_id | name | date_of_birth | user_name | password | maint |
|---|---|---|---|---|---|
| 1001 | MAX | 19910101 | MNN | NULL | abc |
| 1002 | MARTIN | 19920202 | MKR | NULL | cdf |
| 1003 | JOHAN | 19930303 | JON | NULL | ghi |
| 1004 | MARIE-LOUISE | 19940404 | MLA | NULL | jkl |

Then, the step S5 of activating encryption means is performed. Thus, all data written to the base column "password" will now be written in encrypted form. The means for encryption could be a standard software or hardware, for example a apparatus with a DES algorithm. The data is read from the maintenance column and processed by encryption means. The encryption could be either symmetrical or asymmetrical, for example DES or RSA respectively.

After step S5, the records from the maintenance column are copied to the base column through the encryption means in step S6. Thus, the contents of the base column "password" is now stored in an encrypted form.

Then the trigger is removed in step S7. This is done in such a manner that synchronization problems are overcome. Preferably the copying of the records from the maintenance column is performed simultaneously with the removal of the trigger.

Since the maintenance column now contains unencrypted data, it is important that this column is emptied, which is performed in step S8. This can be performed by either updating the column with NULL or writing a random value into the column. Then this example table, "tab", will have the contents as shown in table VI.

TABLE VI

| cust_id | name | date_of_birth | user_name | password | maint |
|---------|------|---------------|-----------|----------|-------|
| 1001 | MAX | 19910101 | MNN | 7je | NULL |
| 1002 | MARTIN | 19920202 | MKR | skj | NULL |
| 1003 | JOHAN | 19930303 | JON | 9fj | NULL |
| 1004 | MARIE-LOUISE | 19940404 | MLA | xjr | NULL |

In order to let the altering of the table have effect on views, the views have to be recreated after each ALTER of a table.

An alternative embodiment will now be described. The above mentioned embodiment is used under the presumption that there are not any table locks (RX/RSX=Row Exclusive/Row Share Exclusive) on the table. In the case of such database locks, additional maintenance columns have to be added in advance. This is preferably performed during installation or planned maintenance, and has not to be done when the actual adding or removing of encryption takes place. Thus, there will be created a maintenance column for each column, which is not currently encrypted. The method according to the alternative embodiment is similar to the preferred embodiment described above and comprises of the steps: activating encryption means for the maintenance columns corresponding to the base column, which is to be encrypted; adding a trigger to the table, which transfers action of data manipulation language (DML) statements intended for the base column to the maintenance column; copying all records from the base column to the corresponding maintenance column through the encryption means; and emptying said base column.

The invention has been described above in terms of a preferred embodiment. However, the scope of this invention should not be limited by this embodiment, and alternative embodiments of the invention are feasible, as should be appreciated by a person skilled in the art. For example, if a column has a constraint indicating that a value of a column can not be NULL, and this column is to be encrypted, the constraint has to be removed temporarily. Also, the method could also be used for changing the strength of encryption on an chosen area or when keys are to be changed, or when data is to be reencrypted.

Such embodiments should be considered to be within the scope of the invention, as it is defined by the appended claims.

The invention claimed is:

1. A method for altering encryption status in a database, said method comprising the steps of:
   providing a table in said database, said table including a maintenance area and a base area, said base area including a first set of records;
   copying said first set of records from said base area to said maintenance area, thereby creating, in said maintenance area, a second set of records;
   while altering encryption status of said base area and in response to a user instruction to modify data in a record in said first set of records, modifying data in a record in said second set of records in said maintenance area instead of modifying data in any record in said first set of records in said base area; and
   after altering encryption status of said base area, copying said second set of records in said maintenance area to said base area to replace said first set of records, thereby creating in said base area a third set of records, and then modifying data in a record in said third set of records in said base area.

2. The method of claim 1, wherein said step of modifying a record in said second set of records is implemented in a trigger which is added to said table.

3. The method of claim 1, wherein modifying a record in said second set of records comprises receiving data manipulation language (DML) statements.

4. The method of claim 1, wherein each base area in said database table has a corresponding maintenance area.

5. The method of claim 1, comprising the further step of: emptying said maintenance area.

6. The method of claim 1, comprising the further step of: emptying said base area before said step of modifying a record in said second set of records.

7. The method of claim 6, wherein said step of emptying the base area comprises the step of:
   setting the value of a record in said first set of records to NULL.

8. The method of claim 1, comprising the further step of: changing a data type of said base area.

9. The method of claim 8, wherein the data type of the base area is changed to a data type representing raw binary data.

10. The method of claim 1, wherein modifying data in a record in said third set of records comprises receiving data manipulation language (DML) statements.

11. The method of claim 1, wherein said base area comprises a first column of said table and said maintenance area comprises a second column of said table.

12. The method of claim 1, wherein said step of altering encryption status of said base area comprises activating encryption means of said base area.

13. A computer readable medium containing instructions for executing the method recited in claim 1.

14. A system configured to execute the method recited in claim 1.

15. A method for altering encryption status in a database, said method comprising the steps of:
   providing a table in said database, said table including a maintenance area and a base area, said base area including a first set of records;
   copying all data of said first set of records from said base area to said maintenance area, thereby creating a second set of records in said maintenance area;
   while altering encryption status of said base area, modifying data in a record in said second set of records in said maintenance area instead of modifying data in any record in said first set of records in said base area upon receiving an instruction to modify data in a record in said first set of records; and
   after altering encryption status of said base area, copying all data of said second set of records in said maintenance area to said base area to replace said first set of records, thereby creating a third set of records in said base area.

16. The method of claim 15, comprising the further step of:
   modifying the third set of records.

17. The method of claim 16, wherein: copying all data of said first set of records from said base area to said maintenance area, further comprises the steps of:
 decrypting all data of said first set of records; and
 copying the decrypted data as the second set of records in said maintenance area.

18. The method of claim 16, wherein said step of copying all data of said first set of records from said base area to said maintenance area creates said second set of records as a mirror of said first set of records.

* * * * *